Dec. 26, 1950 J. H. JAMES 2,535,495

GUIDE FOR DISK TYPE MAGNETIC RECORDER-REPRODUCERS

Filed July 15, 1947 6 Sheets-Sheet 1

INVENTOR
John H. James
BY Eber J. Hyde
ATTORNEY

GUIDE FOR DISK TYPE MAGNETIC RECORDER-REPRODUCERS

Filed July 15, 1947 6 Sheets-Sheet 2

INVENTOR
John H. James
BY
Eber J. Hyde
ATTORNEY

Dec. 26, 1950 J. H. JAMES 2,535,495

GUIDE FOR DISK TYPE MAGNETIC RECORDER-REPRODUCERS

Filed July 15, 1947 6 Sheets-Sheet 3

INVENTOR.

BY John H. James

Eber J. Hyde

ATTORNEY

INVENTOR.
John H. James
BY
Eber J. Hyde
ATTORNEY

GUIDE FOR DISK TYPE MAGNETIC RECORDER-REPRODUCERS

Filed July 15, 1947 6 Sheets-Sheet 5

INVENTOR.
J. H. JAMES
BY [signature]
ATTORNEY

Dec. 26, 1950 J. H. JAMES 2,535,495

GUIDE FOR DISK TYPE MAGNETIC RECORDER-REPRODUCERS

Filed July 15, 1947 6 Sheets-Sheet 6

INVENTOR.
J. H. JAMES
BY M. S. Pinelec
ATTORNEY

Patented Dec. 26, 1950 2,535,495

UNITED STATES PATENT OFFICE 2,535,495

GUIDE FOR DISK TYPE MAGNETIC RECORDER-REPRODUCERS

John H. James, Cleveland Heights, Ohio, assignor to The Brush Development Company, Cleveland, Ohio, a corporation of Ohio Application July 15, 1947, Serial No. 761,062

1 Claim. (Cl. 274—14)

This invention relates to magnetic record transducing and particularly to novel record transducers capable of simple manipulation.

Among the objects of the invention are novel transducing systems in which a transducing operation may be accurately and properly initiated without any complicated threading or adjusting operations.

The further objects of the invention are novel limiting arrangements having only a few operating elements and which accurately terminate the transducing when the end of the recording is reached.

The foregoing and other objects of the invention will be best understood from the following description of exemplifications thereof, reference being had to the accompanying drawings wherein:

Fig. 1 is a plan view of a magnetic record transducing system according to the invention;

Figs. 2 and 3 are sectional views taken along lines 2—2 and 3—3, respectively, of the magnetic record transducing system of Fig. 1;

Figures 1, 3, 4A:
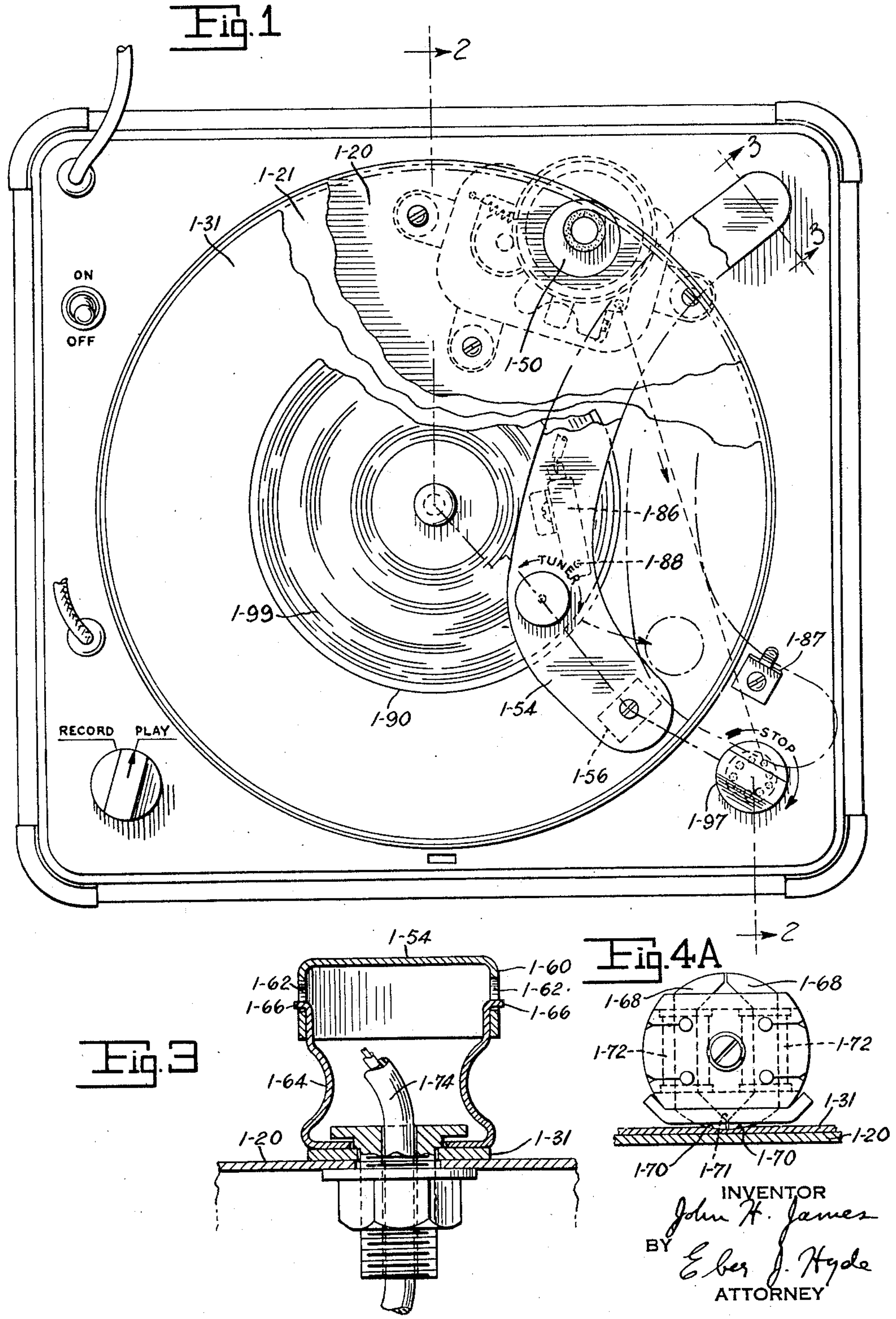
Figs. 4 and 4A are detail sectional views of the transducer of Figs. 1 and 2 taken along the lines 4—4 and 4A—4A of Fig. 2.

Fig. 1 illustrates one practical form of magnetic record transducing system embodying the invention. This transducer includes a rotatably mounted record member holder in the form of a table 1—20 having a central bearing support 1—22 held in place in a generally box-like housing 1—24. As shown, the bearing support 1—22 is held in a bearing socket 1—26 having a collar 1—28 and clamped to the upper surface 1—30 of the housing by the spring friction grips 1—32. The bearing support 1—22 is shown as including a lower cylindrical extension 1—34 fitting within the socket 1—26 and held against removal by a spring retainer 1—36 engaging in a slot 1—38.

The rotatably mounted table 1—20, which is quite similar to the conventional phonograph turntable, may have a depending rim 1—40 for engagement and operation by driving means shown in the form of an A. C. induction motor 1—42. The rim drive is established through the step-down friction drive including the roller 1—44 held on a slidable shaft 1—45 together with the rim engaging roller 1—48 and directly driven by the motor shaft 1—46 against which it is held in contact as by suitable bias means such as a spring 1—47. The passageway 1—50 in the housing cover 1—30 receives the slidable drive shaft 1—45. The rollers 144 and 143 are provided with resilient sleeves or tires 141 and 143 to smoothly supply power and prevent the transmission of vibrations through the drive to the turntable.

Pivotally mounted on the upper surface of the housing beside the turntable indicated at 1—52 there is shown a transducing arm 1—54 which holds a magnetic transducing head 1—56. The arm 1—54 is shown in the shape of an inverted channel having an upper wall 1—58 the ends of which are bent downwardly to provide side walls 1—60. The arm 1—54 is loosely held pivoted around a horizontal axis by openings 1—62 in the side walls 1—60 which fit over and are engaged by the ends of a generally U-shaped clip 1—64 which are bent over to form generally horizontal detents 1—66 projecting through the openings 1—62. The clip 1—64 is in turn pivotally held to the top of the housing so as to be rotatable around a vertical axis.

The transducing head 1—56 includes pole pieces 1—68, shown as formed magnetic sheet material aligned and shaped so that their lower edges form smoothly rounded pole faces 1—70 separated by a small non-magnetic gap 1—71. Windings 1—72 surrounding the pole pieces are connected to the transducing amplifiers which may be contained within the housing 1—24 by means of the shielded cable 1—74 fitted within the channel of arm 1—54 and passing through the bottom of the clip 1—64 and through the top of the housing 1—30.

The transducing arm 1—54 which in plan view is curved, as indicated in Fig. 1, has affixed thereto in its intermediate portion a guide pin 1—74 rotatably mounted in a pin socket 1—78 which is anchored to the upper wall 1—58 of the arm. The upper end of the guide pin 1—76 projects above the arm and is enlarged to form a manually rotatable head 1—80, and the pin is held in place by a split spring ring 1—82 fitted in a peripheral slot 1—84 in the body portion of the guide pin 1—76.

The arm openings 1—62 are shaped to loosely receive the clip detents 1—66 thereby permitting some turning of the transducing arm 1—54 around its longitudinal axis with respect to the housing and turntable in addition to the tilting of the arm 1—54 around the horizontal axis defined by the detents.

The arm also holds switch means shown as micro-switch 1—86 suitably held and having a vertically movable sensing member 1—88 projecting below the arm, as shown.

The turntable 1—20 which may be covered with a layer of flock 1—21 in a manner similar to conventional phonograph tables has a short aligning pin 1—89 projecting upwardly and fixedly held intermediate its center and outer edge. A guide disc 1—90 having a circular sheet-like body portion 1—92 and a centrally raised grip boss 1—94 has a central mounting socket 1—96 and an aligning recess 1—98 by means of which it may be centrally fitted over the turnable on the upwardly projecting end of the bearing support 1—22 and held in fixed relation to the turntable by the aligning pin 1—89. The upper surface of the aligning disc is shaped to form a guide groove 1—99 which may be in the form of a generally continuous spiral for receiving and guiding the lower projecting end of guide pin 1—76.

Figure 6:
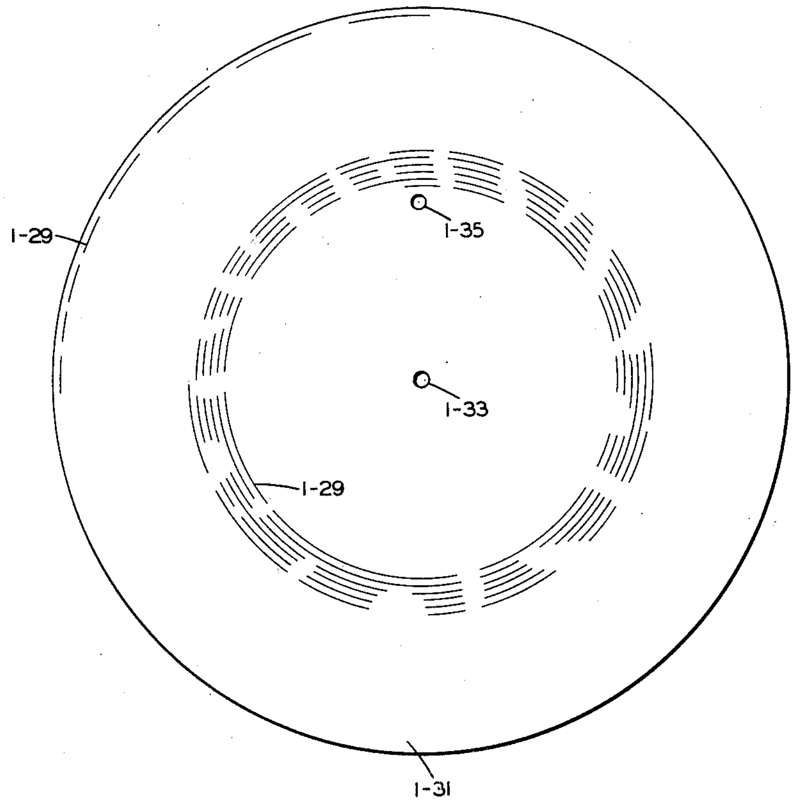
Fig. 6 is a plan view of a record member suitable for use with the transducer of the invention.

For transducing recordings, a disc-like record member 1—31, shown in detail in Fig. 6, having a central opening 1—33 and an aligning opening 1—35 is mounted on the turntable and aligned by fitting the openings 1—33, 1—35 over the corresponding pins 1—22, 1—89 and held in place by then placing the guide disc over the record member 1—31 and mounting and aligning it as shown. The arm 1—54 is then manually placed in a position such that the pole faces 1—70 of the magnetic head 1—56 contact the upper surface of the record member while the lower end of the guide pin 1—76 engages and fits in a portion of the guide groove 1—99. Actuation of the rim drive will then cause the turntable to rotate and carry with it the record member 1—31 and guide disc 1—90 while the guide pin 1—76 causes the transducing arm 1—54 to be fed in a generally radial direction with respect to the turntable, pivoting around a vertical axis at 1—52. The guide groove 1—99 may be so arranged that the feeding movement of the arm is outwardly from the center of the guide disc so that the pole faces of the magnetic core 1—56 scan the upper surface of the record member 1—31 along a generally spiral scanning track.

To ensure the proper aligning of the scanning trace of the record member with the actual position of a recording thereon, the guide pin 1—76 may have its lowermost point eccentrically positioned so that manual rotation of the head 1—80 can be used to adjust the position of the pole faces with respect to the guide groove 1—99 and also with respect to the surface of the record member 1—31.

Figures 2, 4, 5:
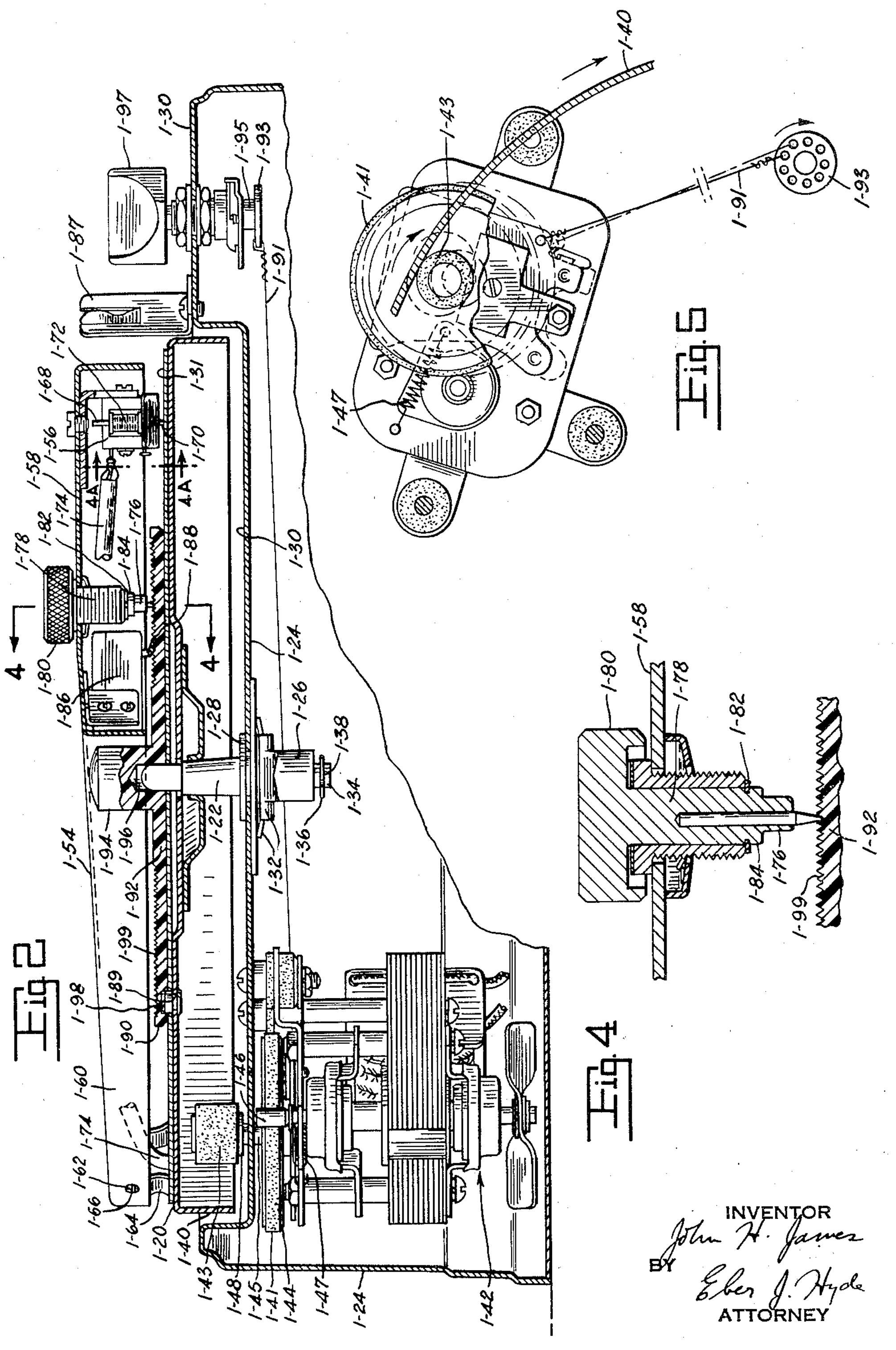
Fig. 5 is a partial top view of the transducer drive with the top of the housing removed and the turntable partially shown in section.

The switch 1—86 is shown as so mounted that its sensing element 1—88, which is downwardly biased, is held up in the switch closing position shown in Fig. 2 during transducing operation by the upper surface of the guide disc 1—90. However, when the transducing is completed and the transducing arm 1—54 is in its outermost position, the sensing member is moved far enough so that it projects beyond the outer edge of the guide disc so that the sensing element 1—88 is free to move downwardly and open the switch. The switch may be connected to stop the rim drive as by opening the supply circuit to the driving motor 1—42.

Manually operable means may also be provided for interrupting the rim drive when desired. As shown, this control may be in the form of a knob 1—97 rotatably mounted on a shaft 1—95 pivotally held on the upper wall 1—30 of the housing and having a flange 1—93 connected as by link 1—91 to the slidable holder of the movable shaft 1—45. An arm rest shown in the form of a clip 1—87 is mounted to receive and grippingly engage a side wall 1—60 of the tone arm when retracted into the position shown in the dot-dash lines in Fig. 1.

The knob 1—97 may be operated to interrupt the turntable drive when the apparatus is in use by rotating the knob far enough to cause the link 1—91 to pull the slide plate holding the slidable shaft 1—45 away against the action of the bias 1—47 so that the roller 1—48 is disengaged from contact with the rim 1—40. The small amount of resistance to which the turntable is subjected by contact with the guide pin and transducing core 1—56 of the arm 1—54 is sufficient to immediately stop the turntable when the driving contact is broken. The rollers 1—44 and 1—48 may be kept in rotatory motion during the interruption of the turntable drive by maintaining the driven engagement of the roller 1—44 with the motor drive shaft 1—46 under the biasing influence of the spring 1—47 in spite of the sliding of the rollers toward the knob 1—97 and away from driving engagement with the rim 1—40. Such maintenance of motion enables prompt acceleration of the turntable to proper operating speed when the transducing operation is continued after an interruption inasmuch as the rotational inertia of the idling rollers will not add to the rotational inertia of the turntable.

A simple interruption of the power supply for motor 1—42 may also be used for interrupting transducings without materially lengthening the duration of the turntable deceleration and acceleration periods.

Transducing operation are initiated by mounting the record member 1—31 in place, as indicated above, and then lifting and carrying the free end of the transducer arm 1—54 inwardly towards the center of the turntable until it engages the knob 1—94 of the guide disc and further inward motion is prevented. This knob 1—94 is so shaped that it acts as a stop for the transducing arm and automatically determines the portion of the record member engaged by the pole faces 1—70 of the transducing core for the commencement of the transducing operation. After bringing the transducing arm over as far as the knob will permit, the free end of the arm is lowered to bring the pole faces into engagement with the record member. The loose pivoting of the transducing arm at the clip automatically permits the arm to longitudinally tilt and adjust itself so that the lower end of the guide pin 1—76 also rests against the upper surface of the guide disc 1—90. The weight of the transducing arm and its attached openings is so distributed and the loosely held pivotal connection at the clip detents 1—62 is so adjusted that the lower end of the pin is held against the upper surface of the guide disc by a force sufficient to assure the proper guiding of the pin along the spiral guide channel 1—99, while at the same time the pole faces of the transducing core 1—56 are held against the record member by a small force, of the order of several grams, sufficient to establish effective magnetic interlinkage with the record track. Additionally, the yieldable layer 1—21 together with the loose pivoting of the transducer arm are arranged to permit a yieldable flexing of the record member 1—31 where it is engaged by the pole faces 1—70 by the small contacting force so that the convex pole faces are engaged along an elongated portion with a record track. This yieldable contact feature assures positive interlinkage with the diminutive non-magnetic gap of the pole faces in spite of minor variations in the exact positioning of this gap with respect to the record track, as more fully explained in the Begun application, Serial No. 612,728, filed August 27, 1945, and as claimed therein.

At the same time, as the transducing arm is lowered into operating contact at the initiation of a transducing operation, the sensing member 1—88 of limit switch 1—86 is inwardly actuated by contact with the upper surface of the guide disc and may be connected in the driving motor supply line to automatically energize the driving motor and begin the transducing. Rotation of the turntable and guide disc causes the guide pin 1—78 to follow the guide channel 1—99, thereby causing the pole faces 1—70 to trace a spiral path over the record member 1—31. The switch 1—86 is so arranged that when the transducing operation is about finished, sensing member 1—88 carried outwardly by the transducing arm is brought beyond the edge of the guide disc 1—90 permitting the downwardly biased sensing member to move downwardly opening the energizing circuit of the drive motor 1—42 and promptly stopping the transducing.

Figure 7:
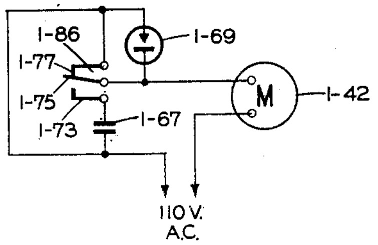
Fig. 7 is a schematic showing of one form of transducer drive control.

Fig. 7 shows one arrangement for operation of limit switch 1—86. The switch as here shown is of the single-pole double-throw type, one contact 1—77 being connected to the supply, such as the conventional alternating current power line, to directly energize the motor 1—42 through the switch blade 1—75, the circuit being completed through the other connector shown. A rectifier 1—69, such as the small selenium rectifier, is connected between the contact 1—77 and the blade 1—75 for supplying D. C. to the motor when the switch blade 1—75 is withdrawn from engagement with contact 1—77. A filter, such as the capacitor 1—67 is connected to the other contact 1—73 of the switch so that engagement of the blade in its downward position with the contact 1—73 effects filtering of the rectified output of rectifier 1—69. The switch 1—86 may be of the snap type requiring very little force for actuation from one position to the other and commercially known as micro-switch. During transducing the switch blade 1—75 is held against its upper contact 1—77 to supply the energizing current for the motor 1—42 which may be of the conventional A. C. induction type ordinarily used on phonographs. The completion of the recording frees the upwardly held switch blade 1—75 so that it snaps downwardly engaging its lower contact 1—73, thereby completing a circuit for establishing a filtered D. C. feed to windings of the drive motor. As explained and claimed in the co-pending Dank application, Serial No. 690,878, filed August 16, 1946, the passage of D. C. through the windings of such a motor establishes a braking action which rapidly decelerates the motor shaft and quickly brings it to a halt.

Figure 8:
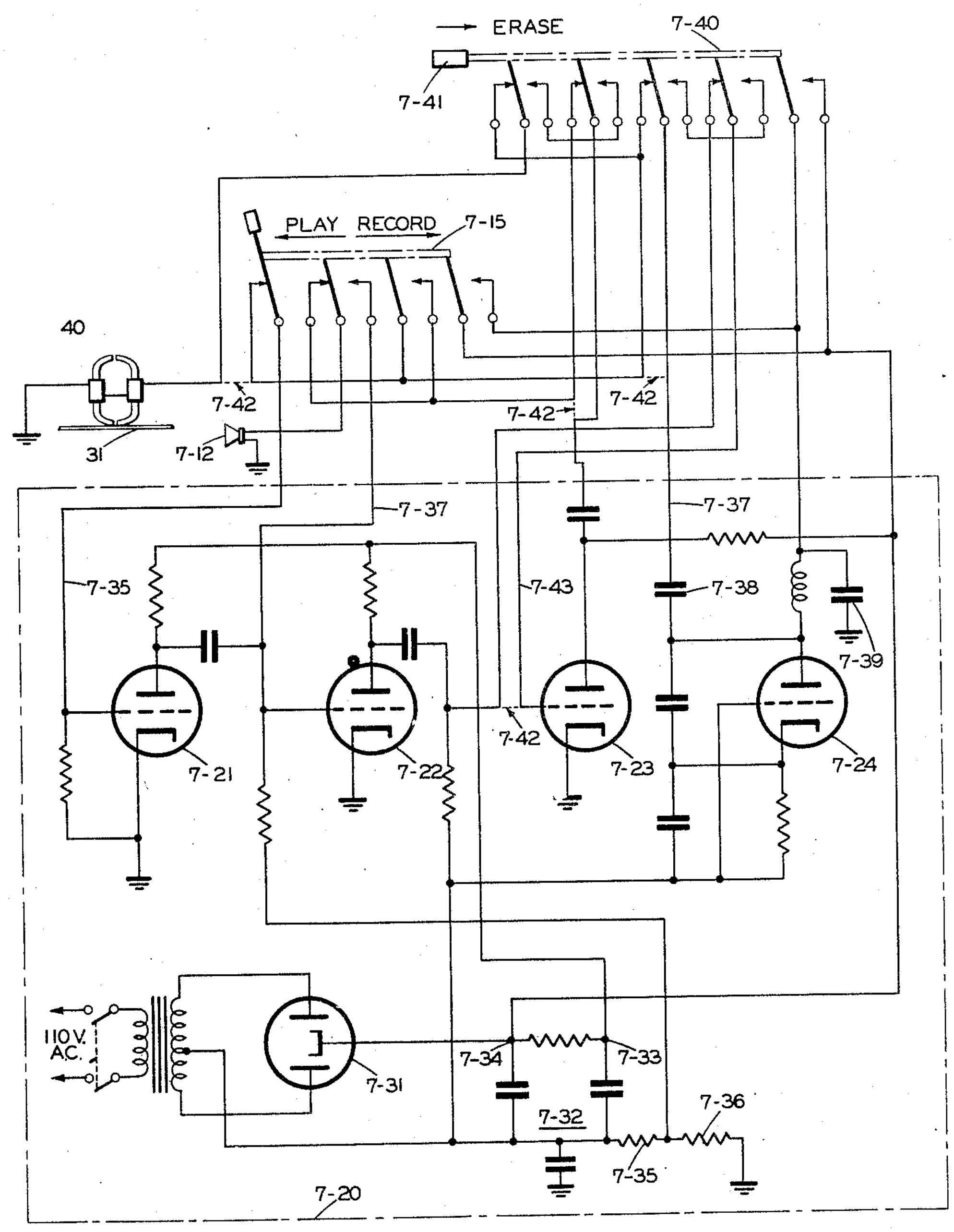
Fig. 8 is a schematic showing of a transducing circuit with which the apparatus may be operated.

Fig. 8 shows the general relationship of one practical form of a magnetic record transducing apparatus and its circuit elements utilizing a single magnetic head for recording, playback and erasing undesired portions of recorded matter along selected parts of record traces by means of the same oscillator which supplies the high frequency bias during the recording process, and utilizing one of the amplifying stages of the playback or recording amplifier circuit for amplifying the oscillations of the bias supply source in order to enable the amplified high frequency currents of the bias source to effect the desired erasure of signals magnetically recorded along the record trace.

The magnetic record reproducing device shown diagrammatically in Fig. 8 comprises a magnetic head 1—56, such as described above, arranged to record signals along a magnetic record trace of a moving magnetic record sheet member 1—31; a single sound transducer device 7—12 serving both as a microphone during the recording process and as a sound reproducer or loudspeaker device during the playblack process; a control switch 7—15 for selectively establishing playback and recording circuit conditions; and a circuit network generally designated 7—20, including the elements of the amplifier bias supply source and the electric power supply for the amplifier and bias supply source.

The sound transducer 7—12 is of a conventionally known type which performs the function of a microphone in converting sound signals reaching it into corresponding electric signals, and as a sound reproducer in converting electric signals supplied thereto into sound. Either a piezo-electric crystal sound transducer or a voice coil type electro-magnetic sound transducer may be used.

The circuit network 7—20 has three amplifier stages associated with the vacuum tube amplifier elements 7—21, 7—22, 7—23 and a bias oscillator stage associated with amplifier vacuum tube element 7—24.

The amplifier stages of the tubes 7—21, 7—22 and 7—23 are arranged to operate in cascade as a three stage amplifier during the playback process, the several amplifier stages being arranged to be resistance coupled to each other. During the recording process only two of the amplifier stages associated with the tube elements 7—22, 7—23 are utilized to amplify the signals supplied by the sound transducer 7—12 operating as a microphone and delivering the required recording currents to the windings of the magnetic head 40. During the recording process the magnetic head is also supplied with the required high frequency oscillatory bias currents produced by the oscillator stage associated with the tube element 7—24, the electrodes of which interconnect with the circuit elements shown and selected so as to generate high frequency oscillations of the order of about 30 k. c., for instance. The electric operating energy is supplied to the amplifier stages and the oscillator stage by a power supply source shown as a two-phase rectifier tube 7—31 which is supplied through a conventionally connected transformer to a domestic current supply source, for instance, of 110 v. A. C., the rectifier alternating current being provided with a filter network 7—32 delivering highly filtered D. C. at terminal 7—33, and less filtered D. C. at terminal 7—34. To the highly filtered D. C. B+ supply filter terminal 7—33 are connected the plate circuits of the initial amplifier stages of tube elements 7—21, 7—22. To the less filtered D. C. B+ supply filter terminal 7—34 are connected the plate circuits of the output amplifier stage of tube element 7—23 and of the oscillator stage tube element 7—24. The filter circuit includes also additional resistance element 7—35 to provide the required operating bias for the input grid of the amplifier tube elements 7—22, 7—23, 7—24.

The record-playback switch 7—15 is shown as being of the conventional type and its contact blades may be actuated either to the playback position, in which it is shown, or to the opposite recording position. There is also shown an additional multi-blade contact switch 7—40 which may be of the type which keeps its contact blades normally biased to the position shown, the blades being brought to the opposite operative position only when suitably actuated as by pressing a pushbutton indicated at 7—41.

Further features of the magnetic recording device shown diagrammatically in Fig. 8 will appear from the following description of its operation.

It is assumed that the erase switch 7—40 remains in the non-operative position shown, in which position its contacts bridge over complete bridging or jumper connections between the circuit portions indicated by the U-shaped dash line jumper connections designated 7—42.

With the record-playback switch 7—15 in the playback position shown its fourth movable contactor elements establish the following circuit connections which provide for the playback of magnetically recorded signals. The ungrounded lead from the windings of the magnetic head 1—56 is connected through the first contact member of the switch to the input lead 7—35 of tube element 7—21 of the first amplifier stage. The signal input supplied by the magnetic head is amplified by the three cascade connected amplifier stages of tube units 7—21, 7—22, and 7—23, the amplified output being supplied by way of output lead 7—36 of tube unit 7—23, and the second contactor of the selector switch 7—15 to the sound transducer device 7—12, which delivers sound output corresponding to the electric signals impressed thereon, the circuit connection being completed by the ground connections shown. The playback operation proceeds as long as the recording medium 1—31 moves relatively to the head 1—56 while the selector control switch 7—15 remains in playback position. Throughout such playback operation the oscillator associated with the tube unit 7—24 remains de-energized.

When the selector switch 7—15 is operated to the opposite recording position its contact blades establish the following circuit connections. In the recording position the sound transducer device 7—12, which now operates as a microphone, is connected through the second contact blade of the selector switch 7—15 to the input lead 7—37 connected to the input grid of the second amplifier stage of tube unit 7—22—which operates during the recording operation as the first amplifier stage, and the output of which, after amplification by the output amplifier tube unit 7—23, is impressed through the output lead 7—36 by way of the third contact of the selector switch 7—15 in its right-hand position to one terminal of the winding of the transducer head 1—56, the circuit being completed through the ground connections shown so as to impress upon the windings of the record transducing head 40 currents which produce in the effective gap region of the head the desired magnetic recording flux.

In the right-hand position of the selector switch 7—15 its fourth contact blade connects the B+ supply terminal 7—34 to the plate circuit of the oscillator tube 7—24 and causes it to produce and deliver the required high frequency bias oscillations. The oscillating circuits of the bias oscillator tube unit 7—34 have an output lead 7—37, including a condenser 7—38, through which the proper component of high frequency biasing current is supplied by way of its connection to the third contact blade of the selector switch to the windings of the transducer head 1—56 so as to produce in the effective magnetic gap region of the head the proper component of high frequency alternating biasing flux. The coupling condenser 7—38 in the oscillator output lead and the other circuit elements of the system are so designed as to make a suitable component of the high frequency oscillations produced by the oscillator tube unit 7—24 with the amplified signal current supplied by the microphone transducer 7—12 in such manner as to induce in the effective gap region of the recording head 1—56 the desired combination of the signal recording flux and the superimposed high frequency biasing flux component. It will be noted that with the circuit arrangement shown the output lead 7—37 of the single oscillator stage remains connected to the windings of the recording playback head 40 not only during a recording operation but also during the playback operation. As shown, an additional condenser 7—39 is connected across the B+ supply lead connection to the plate circuit of the oscillator tube unit 7—24, this condenser 7—39 serving as a capacitive energy storing device which, in conjunction with the other elements of the oscillator circuit, operates to impress upon the windings of the magnetic transducer head 3—45 a decaying high frequency oscillating current of such character as to automatically effect a neutralization of the magnetic core of the transducer head whenever a recording operation is stopped, either by the de-energization of the recording circuits or by actuation of the selector switch 7—15 from the righthand recording position to the lefthand playback position.

With such arrangement the oscillator associated with the tube unit 7—24 continues to produce high frequency oscillating current and continues to supply them to the windings of the magnetic head 40 after the plate circuit of the tube has been disconnected from the B+ supply lead, the oscillating current so supplied to the head decaying within a few oscillating cycles and thereby neutralizing the magnetic core of the head. With the arrangement shown the oscillator stage associated with the oscillator tube unit 7—24 is loaded during a recording operation both by the windings of the magnetic head 1—56 as well as by the circuit elements of the amplifier output stage of tube unit 7—23 to which it is connected by the third contact blade of the selector switch 7—15, and the oscillator circuit is so adjusted as to provide an oscillating output of the proper biasing level when the oscillator stage is subjected to such compound loading.

The circuit elements of the system may be readily so designed that when the selector switch 7—15 is moved from the recording position to the play position, the oscillator output lead 7—37 is disconnected from the amplifier output lead 7—36, thereby decreasing the oscillator load and causing the oscillator output to increase or surge up from the bias level to a level high enough for supplying to the windings of the magnetic head 1—56 oscillating current sufficient to saturate the magnetic core of the head and bring about its magnetic neutralization by a succession of decaying oscillating cycles.

To secure effective erasing action under such operating conditions, the elements of the selector switch 7—15 may be so adjusted that when actuated from the record to the playback position its third contact blade operates first to open the connection of the oscillator output lead from the amplifier output lead before the fourth contact blade opens the plate circuit of the oscillator tube to the B+ supply circuit. In most instances, any residual permanent magnetism of the magnetic core of a magnetic head is sufficiently low as to make it possible to effect its neutralization after the end of a recording operation by a decaying oscillating current, the first magnetizing cycle of which is below the level required for saturating the magnetic core of the head. In other words, the initial or highest level of the demagnetizing current that has to be supplied by the bias oscillator stage to the magnetic head at the end of a recording cycle need not be high enough to completely saturate the magnetic core, and the surge level of the highly saturated load output need not be very much higher than the bias level in order to secure effective demagnetization of the head at the end of a recording operation.

Without limiting the scope of the invention, but in order to enable ready practice of the invention, there are given below data of one form of magnetic recording device of the type shown in Fig. 8 which is now on the market and serves as a low cost speech dictating device.

The magnetic head 1—56 is of the type shown in the Begun application, Serial No. 688,738, filed August 6, 1946, which issued as Patent No. 2,513,617 on July 4, 1950 or Kornei application, Serial No. 688,034, filed August 2, 1946, which issued as Patent No. 2,523,576 on September 26, 1950. The two tube units 7—21, 7—22 form parts of a single tube type 6SL7-GT. The tube units 7—23, 7—24 form part of a single tube 6SN7-GT. Rectifier tube 7—31 is a type 6X6-GT/G tube. The plate circuit of the oscillator tube unit 7—24 includes a reactance of 30 millihenries. The magnetic record transducing device shown is being sold on the market under the trade name "Mail-A-Voice."

In accordance with the invention, a generally simple magnetic record transducing device of the type described above is combined with a simple erasure control arrangement which makes it possible to utilize the single head 1—56, which is used for carrying on, playing back and recording operations with a high frequency oscillating current of a greater level than normally supplied by the oscillator in order to make it possible to erase a selected portion of a record made by the recording head while the sequence control switch 7—15 is either in the recording operation or in the playback operation. In the arrangement of Fig. 8 the additional erase control switch 7—40 is provided to selectively interrupt either a playback or a recording operation and establish circuit connections by means of which the oscillator stage is maintained in an oscillating condition, and its oscillating output is impressed on one or more amplifying stages of the amplifier in such manner as to supply amplified high frequency oscillation to the windings of the recording head sufficient for producing in the effective gap region of the magnetic core of the head a high frequency erasing flux required for erasing records made by or during a previous recording operation. As stated before, the erasing switch 7—40 may be of the type shown and its blades may be permanently biased to establish the bridging connection shown which make it possible to carry on either playback operation or recording operation under the control of the selector switch 7—15. The erasing switch 7—40 is, however, effective to at any time interrupt a recording operation and to establish the following erasing circuit connections to the head when its contact blades are actuated to a right-hand operative position as seen in Fig. 7. In the right-hand operating position the erasing switch 7—40 will establish the following operating condition. Its fifth right-hand contact blade in the right-hand position connects the plate circuit of the oscillator tube unit 7—24 to the B+ terminal 7—34, thereby energizing the oscillator stage and causing it to generate the high frequency oscillations. The third and fourth right-hand contact blades of switch 7—40 in the right-hand position connects the output lead 7—37 of the single oscillator stage tube unit 7—24 to the input lead 7—43 of the last amplifier stage of tube unit 7—22 and disconnects them from their normal circuit connections in order to impress on the output lead 7—36 of the amplifier output stage amplified high frequency oscillating current of the magnitude required for producing with the magnetic head 1—56 the desired erasing flux.

The output lead 7—36 of the output amplifier tube 7—23 is connected by the first and second contact blades of the erasing switch 7—40 in their right-hand position to the windings of the record transducing head 1—56 for supplying it with the amplified high frequency oscillations of a level sufficient to produce in its effective gap region the required erasing flux. The erasing switch 7—40 may be conveniently mounted on one of the readily accessible walls of the recording device so that any time during a recording operation or playback operation a desired portion of a recorded record trace may be erased by momentarily actuating the erasing switch 7—40 from the release position to an operative right-hand position shown. Although the erasing switch 7—40 shown is indicated as one which is manually operated, it may obviously be remotely controlled as by combining it with a relay or solenoid which is arranged to operate its contacts from one position to another.

When signals are magnetically recorded on narrow adjacent longitudinal traces of a continuous magnetic record surface, such as a sheet member 31 described above, difficulties are encountered in playing back the magnetically recorded signals because the magnetic wave elements formed by the recorded signals along the adjacent record traces of the recording surface produce spreading magnetic leakage fields which are picked up by the record transducer head 62 when playing back the recording signals. In the recording arrangement shown, the cross-talk difficulties encountered in playing back magnetic records from adjacent narrow record traces of a magnetic record surface are overcome by using as a recording medium a magnetic material exhibiting a high coercive force of the order of 100 oersteds or more, and operating the recording medium at a low speed of the order of about 4 to 8 inches per second so that the signals of the lowest recorded frequency are recorded in the form of sufficiently short record signal waves as to reduce the spreading leakage field below a disturbing level in the manner disclosed and claimed in the copending application, Serial No. 612,728, filed August 27, 1945, by S. J. Begun.

Figure 9:
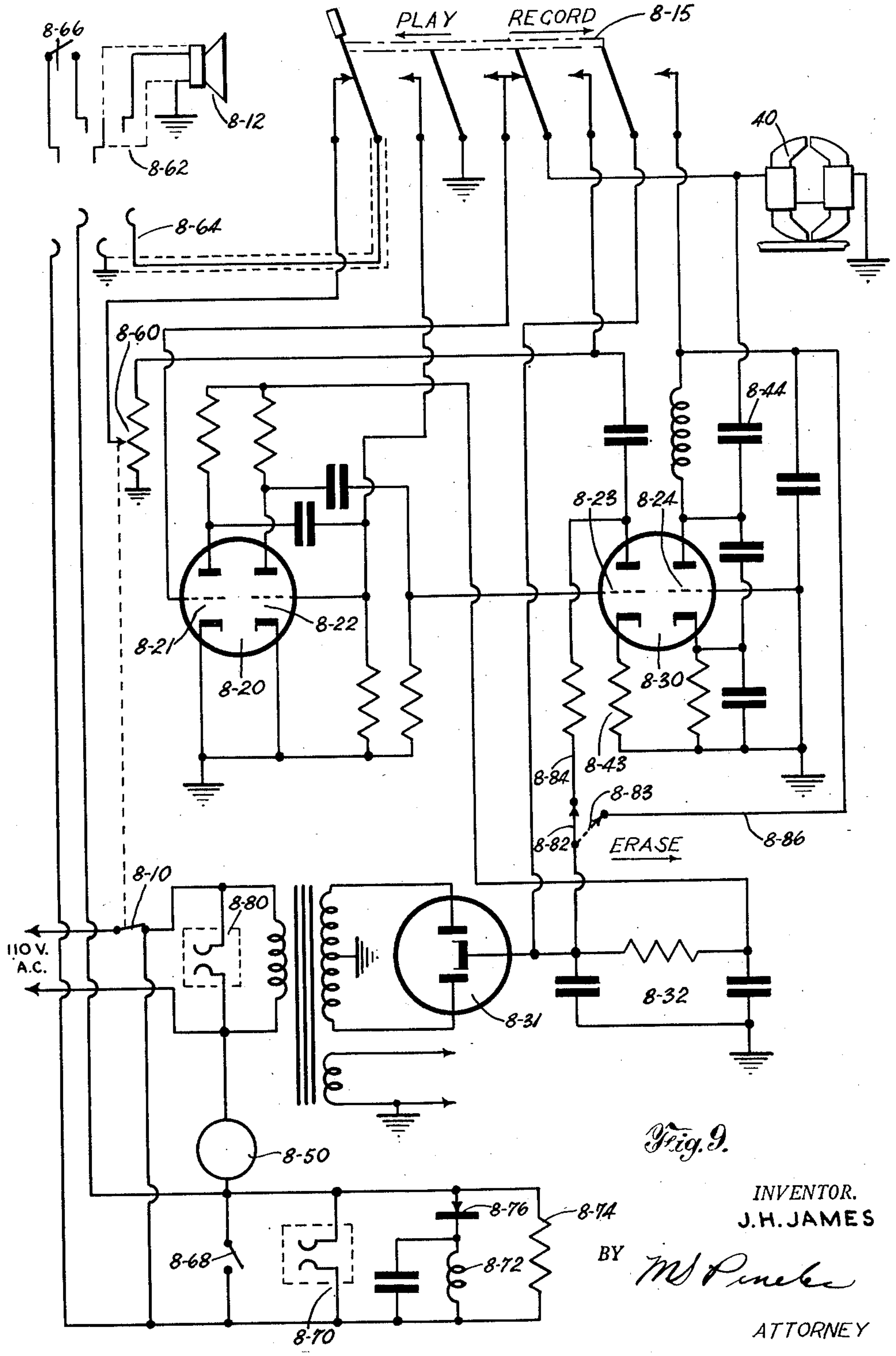
Fig. 9 is a schematic showing of a simplified transducing circuit.

Fig. 9 shows a modification of the transducing arrangement for use with the apparatus of Figs. 1 through 7. In this form the general transducing features are quite similar to those of Fig. 8 and similar parts are correspondingly numbered.

As shown, the transducing control switch 8—15 is set for a playback operation and the On-Off switch 8—10 is closed, supplying power to the turntable motor 8—50 and to the amplifying tubes 8—20 and 8—30 through the rectifier 8—31. Signals picked up by the magnetic head 40 are applied to the grid of the first amplifying stage 8—21 without requiring a separate grid return circuit such as is commonly offered by a grid leak resistor.

The signal is amplified, fed through the second and third amplifying stages 8—22 and 8—23 through the volume control potentiometer 8—60 and thence to the acoustic transducer 8—12 through a pair of the contacts of the jack 8—62 and the plug 8—64. The second amplifying stage 8—22 is operated without bias and the third stage 8—23 has a bias supplied by the cathode resistor 8—43 so that the filter network 8—32 is simplified.

The potentiometer 8—60 and the switch 8—10 may be mounted for operation by a common control as shown.

For recording, the switch 8—15 is set to the extreme right-hand position in which signals from the acoustic transducer 8—12 are fed to the input of the second amplifying stage 8—22, thence through the third amplifying stage 8—23 to the magnetic head 40, where a bias is supplied from the output of oscillator 8—24 by way of capacitor 8—44. At the same time the first amplifying stage which is not used for recording has its grid grounded to decrease the noise level.

The acoustic transducer 8—12 may be of the type suitable for both changing sound signal to electrical currents and for reproducing the sound signals from electric currents, as indicated above, and may be provided with a convenient hand switch 8—66 by which the turntable may be operated. As shown, the energization of the turntable motor 8—50 may be provided through either the switch 8—66 of the remote control type, switch 8—68 which may be mounted directly on the instrument housing, or jack 8—70 in which a foot switch may be plugged. Solenoid 8—72 and resistor 8—74 are kept in the turntable motor circuit. Solenoid 8—72 in series with the rectifier 8—76 is arranged for disconnecting the turntable motor drive as by pulling the idler rollers 1—41 and 1—43 of Figs. 2 and 5 away from the drive position shown. In this manner whenever a turntable switch is open to stop the turntable motor drive the solenoid 8—72 automatically disconnects the engagement between the turntable motor and the turntable. The armature of the solenoid 8—72 may also be provided with an extension in the form of a brake for engaging the turntable rim and applying braking forces whenever the solenoid is actuated so that the stopping of the turntable is practically instantaneous. The windings of the solenoid 8—72 may be shunted by a capacitor, as shown, for filtering the A. C. ripple from the D. C. passed by the rectifier 8—76, thereby eliminating chatter in the solenoid armature.

The resistor 8—74 functions to admit a small amount of energizing current to the turntable motor 8—50 so that its rotor is not completely stopped when one of its control switches is open. The resistor 8—74 is adjusted to admit a small amount of current sufficient to keep the turntable motor running at somewhat reduced speed so that the inertia required for restarting it is considerably decreased.

In the above arrangement any of the switches 8—66 and 8—68, as well as the switch inserted in the circuit of plug 8—70, will operate to shunt the resistor 8—74 and the solenoid 8—72, permitting full current supply to the turntable motor 8—50 and de-activating the solenoid so that the turntable start is substantially instantaneous.

The jack 8—80 may be used for supplying power to accessory equipment, such as loudspeakers, which may be operated in conjunction with the apparatus.

A feature of this equipment of the invention is the simplified erasing control. An erase switch 8—82, which may be of the simple hold-down type biased to outward position in which it establishes a B+ power supply to the third amplifier stage 8—23 by means of the lead 8—84, as shown in full lines in Fig. 9. In downwardly held position, as shown in dash lines at 8—83, the erase switch establishes a B+ supply to the oscillator 8—24 through the connector 8—86. The erasing connection 8—83, 8—86 is shown as shunting a B+ supply to the oscillator normally established through one of the contacts of the transducing control switch 8—15 when set in record position.

With the amplifying circuit values as given above in connection with Fig. 8, the oscillator 8—24 and the final amplifying stage 8—23 are so arranged that with the apparatus set in recording position the outputs of the amplifier 8—23 and the amplifier 8—24 are both connected to the windings of the transducer head 40 and the amplifier output constitutes an appreciable load on the oscillator output. The oscillator 8—24 which is normally capable of producing relatively large amounts of high frequency energy is so loaded by the amplifier 8—23 during a recording operation that its output is greatly diminished and becomes of the proper magnitude for biasing the recording currents passing through the windings of the transducer head. With the switch 8—15 in the playback position, however, only the input of the first amplifier 8—21 is connected to the transducer windings, together with the oscillator output. Inasmuch as the input of amplifier 8—21 is of extremely high resistance it does not appreciably load the oscillator 8—24 so that actuation of the oscillator causes the generation of high frequency currents large enough to demagnetize the portion of the recording medium linked with the magnetic core 40.

In the operation of a transducer with the controls such as shown in Fig. 9, erasure of any portion of a recording may be simply accomplished by holding down the erase switch 8—82 to the position shown at 8—83 with the transducing control switch 8—15 set to playback. In other words, the apparatus is set for playback and the operator listening to the reproduced signals merely holds the erase switch down when the recording to be erased is reached and keeps it down until all of the undesired signals have been removed.

The erase switch 8—82 may be mounted on the top of the transducer housing 1—30, as shown in Figs. 1 and 2 for example, or may be of the remote control type making connection with the amplifier through the jack 8—64 and the plug 8—62.

The jack 8—70 may be modified if desired to include a third contact for operating a back-stepping arrangement such as the one shown in the co-pending Williams application, Serial No. 651,637, filed March 2, 1946, now abandoned. One or more foot switches may be arranged to be plugged into the jack 8—70 to either operate the transducer drive or the back-step as desired. For close range work where no remote control connection is needed and one of the operator's hands is free, the transducer may be back-stepped by merely lifting the transducer arm and moving it back to where its guide pin engages the previously passed groove on the guide disc, after which it can be lowered. This operation is very simple to perform since the guide pin may be made to click over the ridges between the grooves, and the operator can easily keep track of the number of clicks. The back-step may accordingly be a jump of one or more grooves performed in a single operation.

The magnetic recorder of the type disclosed herein is intended for recording speech, or in general for dictating purposes, and in such applications it is sufficient to keep the cross-talk level as high as 18 db. Since the cross-talk effect is greatest the lower the frequency of the record signals, and since signal frequencies of below 500 cycles are not required for intelligible reproduction of speech, the amplifier and the other elements of the recording system of the present invention are designed so as to substantially cut off frequencies below 500 cycles in carrying on recording operations.

Alternatively, carrier frequency recording may be utilized to keep the recorded magnet waves short enough in length to suppress cross-talk as disclosed and claimed in the co-pending Begun application Serial No. 742,793, filed April 21, 1947, as a continuation-in-part of application Serial No. 540,667, filed June 16, 1944, now Patent No. 2,419,195 granted April 22, 1947.

The record member 1—31 may be of any composition. It may, for example, be a thin sheet of paper with a permanently magnetizable coating applied to its surface and covering the area scanned by the transducing pole faces. As shown in Fig. 6, the dash lines 1—29 indicate the spiral track along which the transducing takes place. The central portion of the record member is covered by the guide disc and is not scanned but it is simpler to extend the magnetizable coating uniformly across the entire surface.

In one practical form the record member is a sheet of kraft paper 9 inches in diameter and about 2 mils thick, the coating being a bonded stratum of permanently magnetizable iron oxide powder as described in the co-pending Kornei application Serial No. 685,092, filed July 20, 1946, and in the co-pending Foley application Serial No. 613,092, filed August 28, 1945. More than three minutes of recording can be made on the peripheral two-inch margin of one surface of such a record member with the record rotated at 20 revolutions per minute.

The paper record may be folded, creased, crumpled and even torn without destroying the recording which may be reproduced by smoothing the record member, mounting it on the turntable and operating the transducer with the switch set for playback. Any torn or severed portions of the record may be held in place as by an adhesive tape secured to the back surface of the record on both sides of the tear.

The record member may also be made of a relatively stiff material such as metal, brass, for example, with a permanently magnetizable coating deposited on one surface. The electrolytic coating of mixed cobalt and nickel, as described and claimed in the co-pending Zapponi application Serial No. 738,973, filed April 2, 1947, also makes an excellent magnetic record stratum having a coercive force of 200 or more oersteds.

Other record materials, such as homogeneous permanently magnetizable metal, like stainless steel or non-magnetic media, having an interspersed powdered permanently magnetizable composition like the high coercive force iron alloys, may also be used.

The thickness of the record members has no effect on the transducing. Both surfaces of the record may be coated with the permanently magnetizable strata so that more of the available record surface is utilized, cross-talk between the two surfaces being prevented on the very thin sheets in the same manner indicated above in the co-pending Begun applications for the adjacent turns of a single surface. Thin record members may be reinforced adjacent the aligning elements if desired.

According to a modification of the invention, the transducer may be arranged with a record support separate from the guide disc support. In this manner the record member may be held for transducing at a level spaced from the level at which the guide disc is held. The record support may be so located that the record can be mounted for transducing, or removed after transducing without requiring manipulation of the guide disc, and more of the record surface can be utilized. The transducing arm may have an extension or addition for engaging the guide disc and cooperating with it in the manner shown above for initiating and/or terminating a transducing sequence. The guide disc may also be held in inverted position with respect to the record member suitable linkage being provided to hold a guide stylus against the guide disc in one direction while the transducer core is held against the record in the opposite direction and to cause simultaneous retraction of both the stylus and the transducing arm.

According to another modification of the invention the record support and the guide disc support may be tilted with respect to the horizontal and may also be vertically positioned. A separate support construction in which the supports are positioned vertically or at an angle provides a compact arrangement enabling simpler guide disc manipulation in that observation of the manipulation is possible so that it is not necessary either to space the supports far apart or to mount and dismount the guide discs without benefit of vision.

In a vertically supported construction according to the invention a turntable similar to that of Figs. 1 and 2 may be provided with a central post extending horizontally out from both faces. One face receives the record member and the other the guide disc. The end of the post on which the guide disc is mounted may be provided with a friction catch to securely hold the disc in place. The other post end is also arranged to securely hold the record member against the supporting face of the turntable as by providing a pivoted extension which can be aligned with the post for receiving the aligning aperture of the record and can be pivoted to a tilted position in which it resiliently urges the record member against the support.

The transducing arm and guide stylus may be pivotally held from a point above the top of the turntable and biased forward each other as by a light spring, to provide the desired firm stable magnetic contact between the magnetic core and the record member. For use with limp, pliable record sheets such as those made of thin paper, the transducer arm may also carry a relatively extensive pad member adjacent the magnetic core to hold the thin record sheet firmly against the support in the region adjacent the points being transduced. The pad member may have a portion engaging the record member at the uppermost position of its rotation where the limp record member has the greatest tendency to fall away from the vertical supporting face. One or more non-central aligning apertures may also be utilized to engage corresponding aligning pins in the support in the manner shown in connection with Fig. 1, to establish a firm driving connection to the record member. The pivotal mounting of the stylus and transducer arm may be at places other than above the top of the turntable, suitable counterbalancing being used so that the guiding forces exerted by the guide stylus are not required to oppose anything but a small fraction of the weight of the pivoted structures.

According to another phase of the invention, the transducer arm may be slidably held on the housing so that the guiding movement of the guide stylus causes the transducer arm to slide with respect to its mounting on the housing as well as with respect to the record member. The guide stylus of this modification is aligned with the transducer core and the slidable transducer arm mounting. Where the tilted supporting structure modification is combined with the slidable transducer arm, the sliding of the arm should be arranged to be substantially horizontal.

An important feature of the invention is the fact that inexpensive and readily replaced guide members may be used and the transducing action is automatically directed to the proper regions without any adjustments of the apparatus. The guide members such as guide disc 1—89 may be of moldable construction and of plastic composition which cooperates with the guide stylus in a very effective manner and without generating any appreciable amount of noise due to friction. This is much superior to a metal-to-metal transducer guiding contact inasmuch as the noise level of the metal-to-metal contact is extremely high in the absence of a lubricant which would make the use of the apparatus quite messy. In the practical commercial form of the apparatus, its operation does not involve any necessity or opportunity to even soil the fingers of the operator. The plastic guide discs are readily and inexpensively replaced when worn out.

Figure 10:
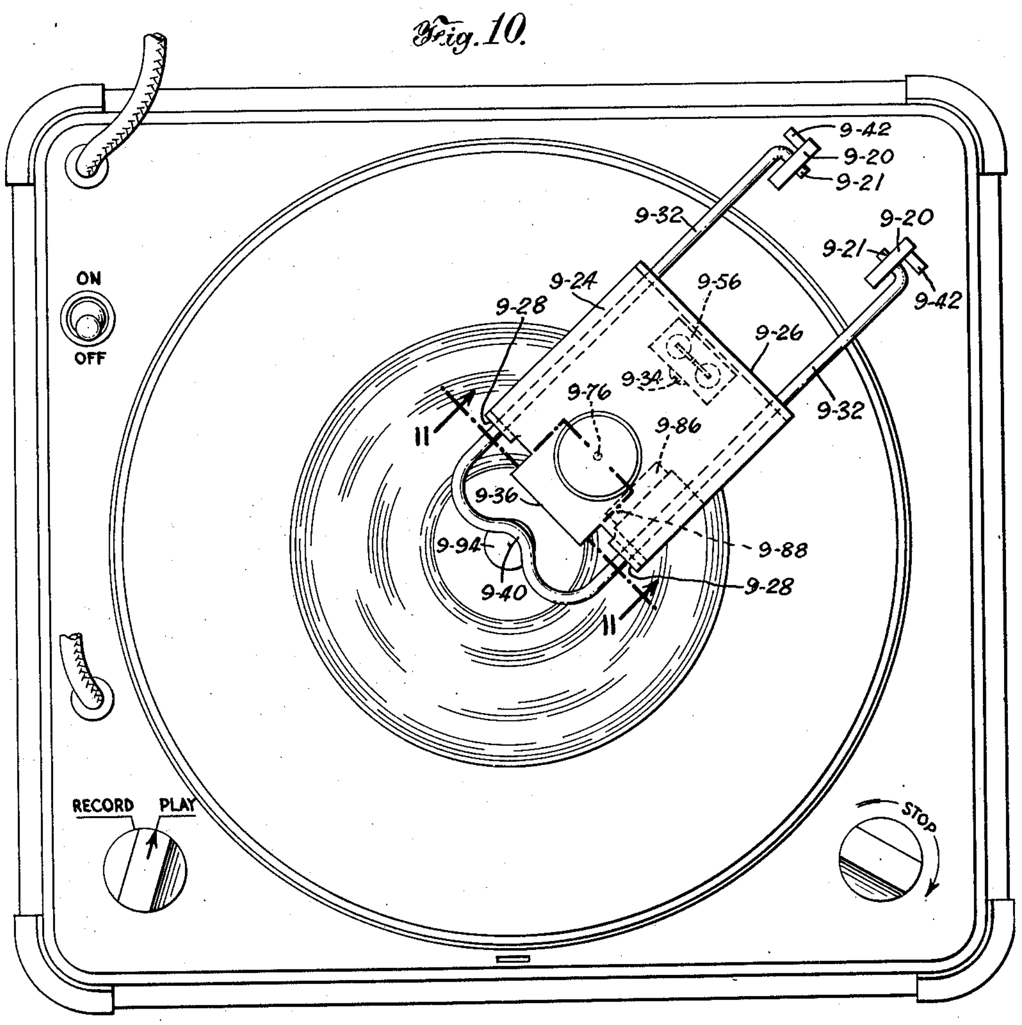
Fig. 10 is a view similar to Fig. 1 showing a further form of transducer apparatus of the invention.
Figure 11:
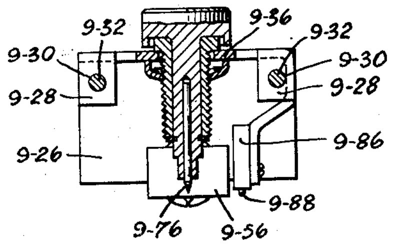
Fig. 11 is a sectional view of the apparatus of Fig. 10 taken along line 11—11.

Figures 10 and 11 show one form of magnetic record transducer having a sliding transducer head mount as described above. As shown, this form may have a pair of lugs, 9—20, standing up from the transducer housing and forming a pivotal mounting for the ends 9—21 of a head mount guide, 9—22. The guide, 9—22, may be arranged for slidably holding the head mount, 9—24, shown as a sheet member having an outer dependent flange, 9—26, and a pair of inner dependent flanges 9—28, all provided with guide apertures, 9—30, for receiving the wire shaped arms, 9—32, of the guide, 9—22. The head mount 9—24 is accordingly slidable along the arms, 9—32, and carries the transducer head, 9—56, as well as a guide stylus, 9—76.

The magnetic head, 9—56, may be held on the dependent flange, 9—26, as by means of the screw, 9—34. The guide stylus may be held on the upper sheet portion of the head mount in a manner similar to that shown in Fig. 4.

The head mount 9—24 is also shown as provided with a stop member shown as a protruding nose portion, 9—36, which cooperates with a stop limit to determine the starting position of the head mount for beginning a transducing operation. The stop limit may either be the knob, 9—94, of the guide disc or a suitably shaped portion, 9—40, of the head slide guide, 9—22.

The other features of the apparatus of Figs. 10 and 11 may otherwise be generally similar to that shown above in connection with Figs. 1 through 5. The slidable head form of the invention is used by tilting the head guide, 9—22 around its pivotal support, 9—21, so as to expose the record receiving support and prepare it for receiving a record member such as a disc shown in Fig. 6. With the record member in place a guide disc may be pressed above it in the manner described in connection with Figs. 1 through 5, after which the transducer head may be brought into operative engagement with the starting zone of the record member. This engagement may be affected by lowering the head mount guide, 9—22, and at the same time sliding the head mount, 9—24, until its slide limit engages the limit stop and the pole faces of the head, 9—56, contact the record disc. The guide stylus, 9—56, is simultaneously brought into guide engagement with a guiding region of the track groove of the guide disc and the transducing can then be initiated by rotation of the record member support.

The transducer head mount 9—24 may also be provided with a switch, 9—86, for automatically ending a transducing operation when the head, 9—56, reaches the end of the scanning path. The switch, 9—86, may be a sensitive microswitch similar to that shown above in Figs. 1 and 2 and may be mounted on an additional flange extending downwardly from the sensing element, 9—88, of the limit switch, 9—86, may be arranged so that the sliding motion of the head mount along the guide, 9—22, carries it past the outer end of the guide track disc as the guide stylus, 9—76, reaches the outer-most guide track region. The sensitivity or force required to operate the sensing member, 9—88, is so adjusted with respect to the weight of the head mount and its slide guide, 9—22, that the sensing element is kept in operated condition whenever the head mount is allowed to rest against the guide track disc.

A feature of the form of the invention shown in Figs. 10 and 11 is that the pole faces of the transducer head are maintained in constant angular relationship with the scanning path of the record member thereby enabling a more exact and constant longitudinal recording on the permanently magnetizable portions of the record member.

The head mount guide such as the wire carrier

9—22 of Fig. 10 may also be arranged to hold itself in restricted position for simplifying record changing operations. In the form shown, the lugs 9—22 may have extensions or pins 9—42 for supporting the carrier 9—22 when it is tilted up.

The expression "magnetic record transducing" as used herein in the specification and claims is intended to mean either the operation of magnetically recording signals on a magnetic recording medium, or the operation of reproducing magnetically recorded signals, or the operation of erasing magnetically recorded signals, or any combination of two or more of these operations.

The principles of the invention explained in connection with specific exemplifications thereof will suggest to those skilled in the art many other applications and modifications of the same. It is accordingly desired that the appended claims be construed broadly, and that they shall not be limited to the specific details shown and described in connection with exemplifications thereof.

I claim:

In a magnetic record transducing apparatus utilizing a record member comprising a disk of sheet material having an exposed surface on which magnetic signals are recorded along a generally spiral physically intangible record trace: a base, a rotatable turntable connected to said base for supporting and rotating said record member, arm means including pivot means mounting one end of said arm means on said base for movement of the other end across said turntable, a magnetic transducer head mounted on said other end of said arm for engaging said record member, a guide stylus connected to said arm at a location between the pivot end and said other end, a solid circular guide disk of diameter less than the diameter of said record member and having a spiral guide groove thereon for engaging and guiding said guide stylus to pivot said arm across said turntable to cause said transducer head to scan said spiral intangible record trace from inside to outside, said guide disk being positioned at the center of said turntable and cooperating with said turntable to hold said record member in fixed position, a circular barrier structure connected to the center of and extending above said guide disk for engaging said arm to limit the radially inward pivot motion of said arm for defining a fixed starting location for said arm as it pivots across said turntable from a radially inward to an outward location.

JOHN H. JAMES.

REFERENCES CITED

The following references are of record in the file of this patent:

UNITED STATES PATENTS

| Number | Name | Date |
|---|---|---|
| 850,036 | Morin | Apr. 9, 1907 |
| 1,357,037 | Duncan | Oct. 26, 1920 |
| 1,663,664 | Kuchenmeister | Mar. 27, 1928 |
| 1,957,158 | Crudo | May 1, 1934 |
| 2,416,135 | Appleby | Feb. 18, 1947 |

FOREIGN PATENTS

| Number | Country | Date |
|---|---|---|
| 613,925 | Germany | May 29, 1935 |